(12) United States Patent
Wangemann et al.

(10) Patent No.: US 10,676,208 B2
(45) Date of Patent: Jun. 9, 2020

(54) EMERGENCY POWER SUPPLY SYSTEM, AIRCRAFT HAVING SUCH AN EMERGENCY POWER SUPPLY SYSTEM AND A METHOD FOR PROVIDING AT LEAST ELECTRIC POWER AND HYDRAULIC POWER IN CASE OF AN EMERGENCY IN AN AIRCRAFT

(71) Applicants: Airbus Operations GmbH, Hamburg (DE); Airbus Defence and Space GmbH, Ottobrunn (DE)

(72) Inventors: Joerg Wangemann, Magdeburg (DE); Hauke-Peer Leudders, Hamburg (DE); Sijmen Zandstra, Hamburg (DE); Peer Drechsel, Hamburg (DE)

(73) Assignees: Airbus Operations GmbH (DE); Airbus Defence and Space GmbH (DE)

( * ) Notice: Subject to any disclaimer, the term of this patent is extended or adjusted under 35 U.S.C. 154(b) by 639 days.

(21) Appl. No.: 14/863,615

(22) Filed: Sep. 24, 2015

(65) Prior Publication Data

US 2016/0090189 A1 Mar. 31, 2016

(30) Foreign Application Priority Data

Sep. 29, 2014 (EP) .................................... 14186828

(51) Int. Cl.
*F04D 13/06* (2006.01)
*B64D 41/00* (2006.01)
(Continued)

(52) U.S. Cl.
CPC ............ *B64D 41/00* (2013.01); *F04D 13/06* (2013.01); *H01M 8/02* (2013.01); *H02J 4/00* (2013.01);
(Continued)

(58) Field of Classification Search
CPC ... B64D 41/00; B64D 2041/005; F04D 13/06; H01M 8/02; H01M 2250/20; H02J 4/00;
(Continued)

(56) References Cited

U.S. PATENT DOCUMENTS 4,883,724 A * 11/1989 Yamamoto ............ B60L 11/185
429/431
5,319,844 A * 6/1994 Huang ...................... H02K 1/06
29/598

(Continued)

FOREIGN PATENT DOCUMENTS

CN 101138114 A 3/2008
CN 103 016 564 A 4/2013
(Continued)

OTHER PUBLICATIONS

EP Search Report dated Mar. 6, 2015.

*Primary Examiner* — Matthew T Largi
(74) *Attorney, Agent, or Firm* — Lerner, David, Littenberg, Krumholz & Mentlik, LLP (57) ABSTRACT

An emergency power supply system for providing hydraulic power and electric power in an aircraft includes a fuel cell having an electric outlet for providing electric power, a conversion unit couplable with at least one of an AC bus and a DC bus and the electric outlet, and at least one hydraulic pump having a reconfigurable electric motor and a motor control unit and being couplable with a hydraulic system for providing hydraulic power. The conversion unit is adapted for converting a supply voltage of the electrical outlet to at least one of an AC voltage matching a predetermined (Continued)

voltage at the AC bus and a DC voltage matching a predetermined voltage at the DC bus. The reconfigurable electric motor is couplable with the fuel cell and the AC bus and is adapted for being operated by the supply of electric power either from the fuel cell or the AC bus.

14 Claims, 4 Drawing Sheets (51) Int. Cl.
*H01M 8/02* (2016.01)
*H02J 4/00* (2006.01)
*H02J 7/14* (2006.01)
*H02J 9/00* (2006.01)
*H02P 25/18* (2006.01)
*H02P 4/00* (2006.01)
*H02J 7/00* (2006.01)
*H02J 3/38* (2006.01)

(52) U.S. Cl.
CPC ............. *H02J 7/14* (2013.01); *H02J 9/00* (2013.01); *H02P 4/00* (2013.01); *H02P 25/184* (2013.01); *B64D 2041/005* (2013.01); *H01M 2250/20* (2013.01); *H02J 3/387* (2013.01); *H02J 7/0022* (2013.01); *Y02T 90/32* (2013.01); *Y02T 90/36* (2013.01)

(58) Field of Classification Search
CPC ...... H02J 7/14; H02J 9/00; H02J 3/387; H02J 7/0022; H02P 25/184; H02P 4/00
See application file for complete search history.

(56) References Cited

U.S. PATENT DOCUMENTS

| | | | |
|---|---|---|---|
| 6,296,957 B1* | 10/2001 | Graage | B64D 41/00 244/58 |
| 8,722,272 B2 | 5/2014 | Westenberger et al. | |
| 9,028,990 B2 | 5/2015 | Gans et al. | |
| 2003/0075643 A1 | 4/2003 | Dunn | |
| 2008/0210812 A1* | 9/2008 | Gans | B64D 41/007 244/58 |
| 2009/0104493 A1* | 4/2009 | Metzler | B64D 41/00 429/515 |
| 2012/0161512 A1 | 6/2012 | Metzler et al. | |
| 2014/0265994 A1* | 9/2014 | Mao | H02P 25/22 318/773 |

FOREIGN PATENT DOCUMENTS

| | | |
|---|---|---|
| DE | 10 2007 017820 A1 | 8/2008 |
| EP | 2 222 562 B1 | 8/2012 |
| EP | 1 859 499 B1 | 11/2012 |
| GB | 2 491 982 A | 12/2012 |
| JP | 2012 102524 A | 5/2012 |

* cited by examiner

EMERGENCY POWER SUPPLY SYSTEM, AIRCRAFT HAVING SUCH AN EMERGENCY POWER SUPPLY SYSTEM AND A METHOD FOR PROVIDING AT LEAST ELECTRIC POWER AND HYDRAULIC POWER IN CASE OF AN EMERGENCY IN AN AIRCRAFT

FIELD OF THE INVENTION

The invention relates to an emergency power supply system for providing at least hydraulic power and electric power in an aircraft, to an aircraft having an electric system and a hydraulic system as well as such an emergency power supply system. The invention further relates to a method for providing at least electric power and hydraulic power in case of an emergency.

BACKGROUND OF THE INVENTION

Emergency power supply systems are known, which are based on a ram air turbine (RAT), which is mechanically coupled with a hydraulic pump for providing hydraulic power to actuators of a flight control system. For providing electric power, a hydraulic powered generator is coupled with the hydraulic system.

The concept of providing a fuel cell system instead of a generator for providing electrical power in an emergency case is known e.g. from EP 1 859 499 B1 and EP 2 222 562 B1.

A replacement of a ram air turbine with a fuel cell requires modifications of the electric system or the hydraulic system, as a fuel cell is only able to provide a direct current having a voltage clearly below a required voltage for generating an alternating current with a common voltage, such as 115 V at 400 Hz. Also, the fuel cell only delivers a direct current, which additionally depends on the electrical load applied to the fuel cell.

Furthermore, common electric hydraulic pumps also require a rather high voltage and, especially during start-up, a great current. Consequently, following a conservative design approach, a fuel cell would comprise a distinct size and weight and a variable DC output voltage would have to be accepted.

BRIEF SUMMARY OF THE INVENTION

An aspect of the invention therefore may provide an improved emergency power supply system having a distinct reliability, allow a safe operation and require a minimum additional weight.

It is proposed an emergency power supply system for providing at least hydraulic power and electric power in an aircraft. The system comprises at least one fuel cell having an electric outlet for providing electric power, a conversion unit for conversion of electric power couplable with an AC bus of the aircraft and the electric outlet of the at least one fuel cell and at least one hydraulic pump having a reconfigurable electric motor and a motor control unit and being couplable with a hydraulic system of the aircraft for providing hydraulic power. The conversion unit is adapted for converting a supply voltage of the at least one fuel cell outlet to an AC voltage matching a predetermined voltage at the AC bus. The reconfigurable electric motor is couplable with the at least one fuel cell and the AC bus, wherein the reconfigurable electric motor is adapted for being operated by the supply of electric power either from the at least one fuel cell or the AC bus.

The at least one fuel cell may be a single fuel cell, a fuel cell stack or a plurality of fuel cell stacks. The at least one fuel cell is able for conducting a fuel cell process under consumption of hydrogen or a hydrogen containing gas and oxygen or an oxygen-containing gas for generating electric power, water and oxygen depleted air in case air is used as an oxidant. The fuel cell itself may be of any suitable type, which may include a low temperature, a medium temperature or a high temperature fuel cell type, which produces electricity, heat and water. For the use in vehicles, the fuel cell may preferably include proton exchange membrane fuel cells, also known as polymer electrolyte membrane fuel cells (PEMFC). However, depending on the power requirement and the available installation space inside the aircraft the fuel cell may also be realized as a solid oxide fuel cell, which experiences clearly higher operating temperatures.

The conversion unit is to be understood as an apparatus capable of conducting a voltage conversion, which conversion unit may also be referred to as a voltage converter. In the state-of-the-art, a plurality of different types of voltage converters are known. For example, alternating current may easily be converted using a transformer. However, the conversion from one direct current voltage to another direct or alternating voltage current requires power electronics.

In the context of the invention, the conversion unit may primarily conduct the function of converting a direct current from the electric outlet of the fuel cell to an alternating current for the AC bus. However, as apparent from the description below, this is not to be understood as a limitation.

It is advantageous to provide a hydraulic pump having a reconfigurable electric motor which is adapted for being operated by the supply of electric power either from the electric outlet of at least one fuel cell or the AC bus. Hence, it is not ultimately necessary for providing a dedicated hydraulic pump, but instead use an already existing hydraulic pump in a hydraulic circuit, wherein the emergency power supply system integrates this existing hydraulic pump in its operation in an emergency case.

This setup allows, besides providing an emergency electrical power supply, to drive the reconfigurable electric motor by the supply of an AC voltage from the AC bus during normal operation. In an emergency situation, the electric motor may be reconfigured in order to be able to be driven by the supply of electric power from the at least one fuel cell. Consequently, only a minimum change to an existing aircraft architecture comprising hydraulic powered flight controls and an AC bus is necessary. The invention therefore provides a system that constitutes a clearly weight optimized overall emergency system with special consideration to the integration in an aircraft.

The reconfiguration of an electric motor is to be understood such that an electric motor is capable of changing connection schemes of windings in the electric motor, especially the stator. Depending on the number of windings there may be numerous different connection schemes that allow to distinctly lower the required voltage for operating the electric motor. For example, a wye connection may be changed to a delta connection. However, also two pole pairs per phase connected in series may be used, such that the branches of a wye connection scheme and the delta scheme each have two pole pairs. Also, two pole pairs may be connected parallel to each other. It is clear that also combinations thereof may be realized. Still further, the reconfiguration may also include a reconfiguration of a motor control electronics. A person skilled in the art will be provided with a number of exemplary embodiments below in order to choose a suitable setup.

Altogether, the emergency power supply system according to the present invention is a weight efficient solution for maintaining or increasing a reliability and safety of an aircraft especially for emergency situations. By the above-mentioned features it is possible to provide a fuel cell with a voltage clearly below a required voltage to generate an alternating current suitable of being provided into an AC bus or for driving the electric motor. Through a reconfiguration the motor may be operated by means of the fuel cell with a particularly small size and, furthermore, no dedicated electric motor is necessary for the emergency power supply system.

In an advantageous embodiment, the electric motor comprises a stator having a set of interconnected stator windings, wherein a connection scheme of the stator windings is selectable from at least two patterns. As mentioned above, an electric induction motor includes a stator core assembly having several windings or winding groups corresponding to each phase of the supply current. By changing the interconnections between these windings, different characteristics of the electric motor may be selected. For example, switching the winding interconnections from a wye to a delta pattern the required voltage for driving the electric motor decreases. If exemplarily an electric motor is designed for an operation at 115 V, this voltage value may be associated with a wye connection. When this connection is switched to a delta connection, the required voltage may be as low as 66 V.

Another embodiment comprises a motor control electronics unit, which is connectable to the electric outlet of the at least one fuel cell and the electric motor, wherein the motor control electronics unit is adapted for converting the voltage delivered by the fuel cell into a motor supply voltage applying field oriented control. Field oriented control, which is also known as vector control, is to be considered a variable frequency drive control method for an electric motor. Such a control allows to generate a 3-phase pulse width modulation motor voltage output, which is able to influence torque and speed of the motor. This allows to further reduce the required voltage delivered by the fuel cell.

Still further, the conversion unit is connectable to the electric outlet of the at least one fuel cell, wherein a transformer is connected to the conversion unit for increasing the voltage delivered by the conversion unit for supply into the AC bus, and wherein the electric motor is connectable to the conversion unit. The conversion unit may therefore only need to provide a voltage sufficient for operating the electric motor, while in turn it is necessary for increasing the voltage for use in the AC bus.

The conversion unit may be adapted for converting a voltage delivered by the electric outlet of the at least one fuel cell into an AC voltage supplyable into the AC bus and into a DC voltage supplyable to a DC bus. Essentially, such a combined DC/DC/AC converter may be a compact, integrated unit which may replace an existing transforming and rectifying unit in an AC bus. Hence, this allows for minimizing the additional weight.

The emergency power supply system may furthermore comprise a switching unit for selectively connecting the electric motor to either the AC bus or one of the conversion unit and a motor control electronics unit delivering a motor supply voltage. Through the use of a switching unit, which may comprise a mechanical or electronic switch, a clear segregation of operation modes may be accomplished, which increases the safety and reliability.

It may be advantageous if the switching unit is integrated into the motor control electronics and adapted for selectively connecting the electric motor to either the AC bus or an inverter arranged in the motor control electronics. This leads to a further reduction in the required installation space. In case the switching unit comprises electronic components, these may be cooled by an existing cooling system in the motor control electronics unit.

Still further, the electric motor is connected to a motor control electronics unit, wherein the motor control electronics unit is connectable to the electric outlet of the at least one fuel cell, wherein the conversion unit is connectable to the at least one fuel cell and the motor control electronics unit, wherein the switching unit is connectable to the conversion unit and an AC bus of the aircraft, and wherein the switching unit is adapted for transferring a current from the conversion unit into the AC bus of the aircraft in a galvanically separated manner.

The at least one fuel cell may furthermore be adapted for using air as an oxidant. Hence, the emergency power supply system may also be used as a supply system for providing oxygen depleted air, independent from any necessity of providing electrical power.

The emergency power supply system may furthermore comprise a load control unit, which is adapted for selectively connecting at least one electrical load to the at least one fuel cell for allowing a continuous operation of the at least one fuel cell for generating a continuous flow of oxygen depleted air. Due to the oxygen consuming fuel cell process, the emergency power supply system may conduct a further function, which is directed to inerting a space inside the aircraft. It is conceivable that the emergency power supply system according to the invention may temporarily also be operated merely for providing oxygen depleted air. This space may be any space inside the aircraft, such as a cargo compartment or a fuel tank. It may be possible that smoke or fire is detected in the aircraft, leading to the requirement of a fire knockdown or at least the creation of an inert atmosphere in the respective space. For this purpose, the fuel cell may be operated under consumption of air as an oxidant. In this case, air is fed to the cathode of the at least one fuel cell, wherein its oxygen content is depleted. Outflowing oxygen depleted air may be routed to the respective space by means of a pipe, duct, holes, channel or any other transport means that allow the transport of oxygen depleted air. For maintaining the quality of the oxygen depleted air, i.e. a constant low oxygen content, it is advantageous to maintain a continuous operation at the same flow of educts to the fuel cell. Through applying a load to the fuel cell, a constant current and, consequently, a constant flow of educts is accomplished. If the fuel cell still delivers electrical power to a hydraulic pump and/or an electrical network, this load may also be applied, preferably in combination with a load control electronics, which monitors the current delivered by the fuel cell in order to adjust the load for maintaining a constant operation of the fuel cell.

The invention furthermore relates to an aircraft having at least one AC bus, at least one hydraulic network and at least one emergency power supply system described above.

The aircraft may further comprise at least one space having an inlet for oxygen depleted air, wherein the at least one fuel cell of the emergency power supply system is adapted for using air as an oxidant, such that oxygen depleted air is generated during the operation of the at least one fuel cell, wherein a transport means extending from the at least one fuel cell and at least one of the at least one space delivers the oxygen depleted air into the respective space.

In the aircraft the hydraulic pump may be coupled with a hydraulic system, which does not comprise an engine driven hydraulic pump. However, the hydraulic pump may also be coupled with a hydraulic system, which comprises an engine driven hydraulic pump.

The invention also relates to a method for providing at least hydraulic power and electric power in an aircraft, the method comprising the steps of providing electric power by means of at least one fuel cell having an electric outlet, converting electric power by means of a conversion unit provided by at least one of an AC bus and a DC bus of the aircraft and the electric outlet of the at least one fuel cell and to at least one of an AC voltage matching a predetermined voltage at the AC bus and a DC voltage matching a predetermined voltage at the DC bus, supplying converted electric power to at least one of the AC bus and the DC bus, and providing hydraulic power to a hydraulic system of the aircraft by means of at least one hydraulic pump having a reconfigurable electric motor and a motor control unit. The reconfigurable electric motor is couplable with the at least one fuel cell and the AC bus, wherein the reconfigurable electric motor is adapted for being operated by the supply of electric power either from the at least one fuel cell or the AC bus.

The method comprises operating the conversion unit in at least one operation mode of a group of operation modes, the group consisting of:
1) supplying the conversion unit with an AC voltage from an AC bus, converting the AC voltage to a DC voltage matching the DC bus,
2) supplying the conversion unit with a DC voltage from the at least one fuel cell, converting the DC voltage to a DC voltage matching the DC bus and converting the DC voltage to an AC voltage matching the AC bus, and
3) supplying the conversion unit with a DC voltage from the DC bus and converting the DC voltage to an AC voltage matching the AC bus.

Still further, the invention also relates to a conversion unit for conversion of electric power, which conversion unit is couplable with at least one of an AC bus and a DC bus of the aircraft and an electric outlet of at least one fuel cell. The conversion unit is adapted for converting a supply voltage of the electrical outlet of the at least one fuel cell to at least one of an AC voltage matching a predetermined voltage at the AC bus and a DC voltage matching a predetermined voltage at the DC bus. Further advantageous embodiments and further improvements of such a conversion unit are explained above referring to such a conversion unit integrated into an emergency power supply system as well as explained below referring to the drawings, in which such a conversion unit is shown integrated into various embodiments of an emergency power supply system.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
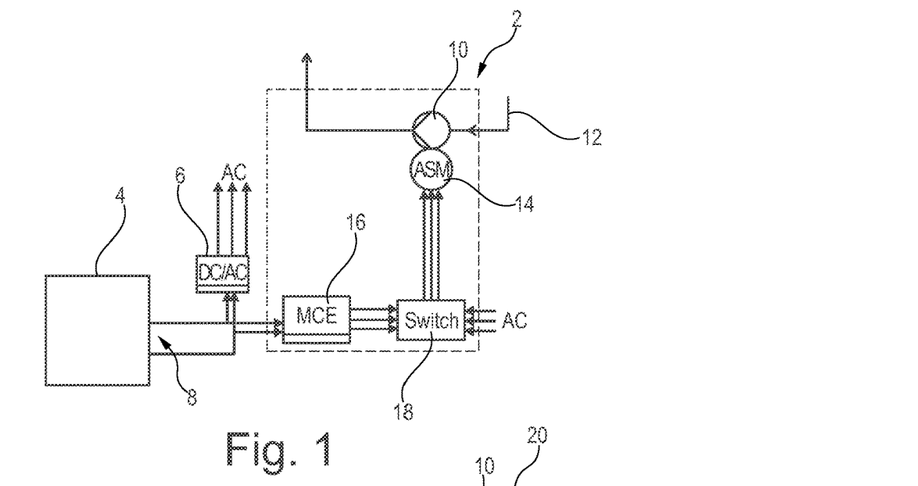
FIG. 1 shows a block-oriented, schematic illustration of a first exemplary embodiment of the emergency power supply system of the present invention having separated power electronics for motor control and AC generation.

FIG. 1 shows a first exemplary embodiment of an emergency power supply system 2 according to an embodiment of the invention. A fuel cell stack 4 is coupled with a conversion unit 6 through an electric outlet 8. The conversion unit 6 is adapted for converting the direct current delivered by fuel cell stack 4 into an alternating current suitable for being supplied to an essential AC power bus of the aircraft (not illustrated).

The emergency power supply system 2 comprises a hydraulic pump 10, which is coupled with a hydraulic system 12 of the aircraft for delivering hydraulic power. Some commercial aircraft, e.g. aircraft of the A320 family of manufacturer Airbus, comprises three different hydraulic systems, which are often distinguished by certain colours, namely green, yellow and blue. Some major users of the green system are e.g. landing gear, slats, flaps, brakes, and some flight control surfaces. Flaps, yaw damper, parking brake, rudder, nose wheel steering, etc. are coupled with the yellow hydraulic system. The green and yellow hydraulic systems comprise engine driven pumps. The blue hydraulic system is powered by an electric hydraulic pump. The emergency power supply system 2 shown in FIG. 1 may preferably be coupled with the blue hydraulic system, as only minor modifications need to be accomplished.

The hydraulic pump 10 is mechanically coupled with an electric motor 14, which is in fact a reconfigurable electric motor 14. In general, it may be advantageous if the electric motor 14 is realized as an induction motor, in particular an asynchronous machine (ASM), in which the rotational speed of the rotor is not necessarily equal to the rotational speed of the magnetic field caused by the alternating current. Due to the reconfiguration, the electric motor may be operated from a fuel cell 4 and the AC bus, respectively.

For controlling the rotational speed of the electric motor 14 and for limiting the required current especially during start-up of the electric motor 14, a motor control electronics unit 16 is placed between the fuel cell stack 4 and the electric motor 14. The motor control electronics unit 16 may be adapted for further converting the direct current delivered by the fuel cell stack 4 into an alternating current using power electronics, e.g. based on a field-oriented control, enabling an optimum operation of the electric motor 14. The reconfiguration may be conducted by selecting the connection pattern of stator windings and/or through the motor control electronics 16.

As will become apparent from the description below, a switch 18 may couple with or decouple the fuel cell stack 4 from the electric motor 14, while at the same time the AC bus may be decoupled from or coupled with the electric motor 14. Hence, switch 18 allows to operate the electric motor 14 during normal flight of the aircraft with power from the essential AC bus, while in an emergency situation the switch 18 may couple the fuel cell stack 4 to the electric motor 14.

Through the integration of a conversion unit 6 and the motor control electronics unit 16 two separate power electronics are used to supply the (fixed frequency) AC bus and the electric motor 16. Consequently, both components may be designed and operated independently in a most optimized way. It is clear that different topologies are possible for a DC/AC conversion unit 6. Therefore, the use of these two separate power electronics have a significant weight benefit.

Also, the setup easily allows ramping up and operating the hydraulic pump 10 independently. The application of field oriented control enables further reduction of the required voltage delivered by the fuel cell stack 4. Nevertheless, both of these devices may share the same housing and some components may share the same heat sinks or the capacitance of a DC bus.

In this regard it is stated that an AC bus of an aircraft commonly has a voltage of 115 V at a frequency of 400 Hz. However, the fuel cell stack 4 delivers a voltage of e.g. 110 V to 150 V, which is much lower, e.g. by a factor of 2, than required to generate 115 V of alternating current through an inverter. The motor control electronics unit 16, which may be an integral part of the electric motor 14. Further details of the motor control electronics unit 16 may be found in FIG. 6.

Figure 2:
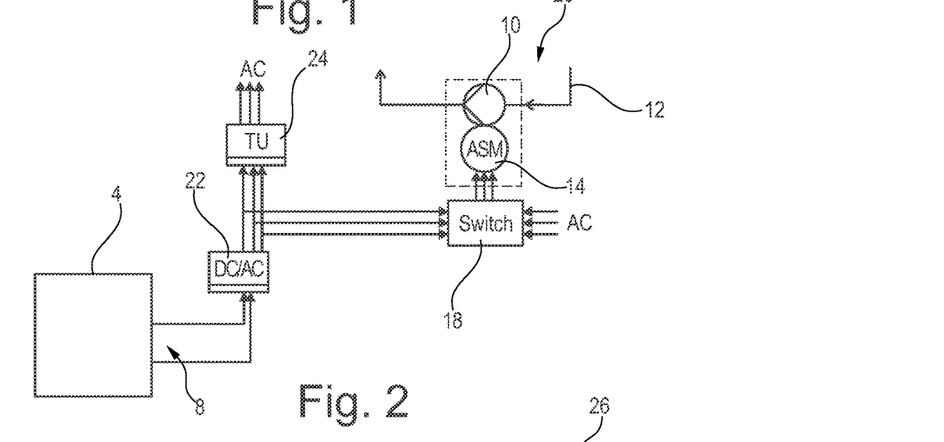
FIG. 2 shows a block-oriented, schematic illustration of a second exemplary embodiment of the emergency power supply system of the present invention having a single power electronics for motor control and AC generation.

In FIG. 2, another exemplary embodiment of an emergency power supply system 20 is illustrated. Here, the fuel cell stack 4 is coupled with a conversion unit 22, to which a transformer 24 is connected for boosting the voltage delivered by the conversion unit 22 to the desired AC voltage, such as 115 V. Between the conversion unit 22 and transformer 24, the switch 18 is placed, to which an electric motor 14, e.g. an induction machine, in particular an asynchronous machine, is coupled.

In this solution, a single inverter in the conversion unit 22 is used, which exemplarily first ramps up the electric motor 14, e.g. in a voltage-frequency control (U/F-mode) and afterwards connects the AC bus, when the electric motor 14, or the hydraulic pump 10, respectively, is running. For this setup, the transformer 24 is required for boosting the voltage to 115 V AC. To decrease system weight, only the output of the transformer 24 connected to the AC bus is filtered. This setup requires a clearly smaller number of semiconductor switches and a very simple control strategy.

Figure 3:
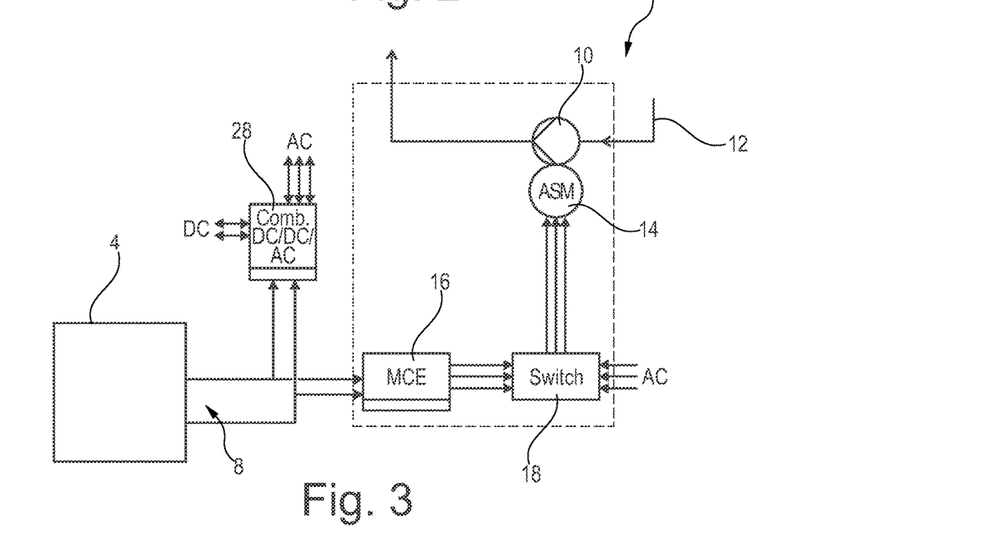
FIG. 3 shows a block-oriented, schematic illustration of a third exemplary embodiment of the emergency power supply system of the present invention having separated power electronics in form of a combined DC/DC/AC conversion unit for AC and DC generation and a motor control electronics unit for controlling the motor.

In FIG. 3, another exemplary embodiment of an emergency power supply system 26 is shown. Here, a fuel cell stack 4 delivers electric power to a combined DC/DC/AC conversion unit 28, which is capable of delivering an alternating current to an AC bus as well as a DC voltage to a DC bus. Aircraft often comprise a DC bus, which carries a voltage of 28 V, while a typical AC bus carries a voltage of 115 V.

The hydraulic pump 10 is again coupled with a hydraulic system 12 and mechanically connected to an electric motor 14 supplied with electric power from a motor control electronics unit 16. Hence, the section of the emergency power supply system 26 directed to the hydraulic pump 10 is equal to the respective section in FIG. 1.

In a first operation modus, the conversion unit 28 is supplied with electrical power from the AC bus, leading to the conversion of an AC voltage into a DC voltage, which is supplied to the DC bus. The AC voltage may be provided through a generator driven by a main engine or an APU. Supplied from a 115 V AC bus, a 28 V DC voltage is provided. In a second operation modus, the fuel cell 4 supplies electrical power based on a DC voltage into the conversion unit 28, which then converts the DC voltage into an AC voltage, e.g. 115 V. Still further, a DC voltage for the DC bus is also provided, e.g. 28 V. Theoretically, a third operation modus is possible in case an active rectifier is used inside the conversion unit, which allows to let the conversion unit 28 be supplied with electrical power from the DC bus based on a DC voltage, which is converted into an AC voltage for the AC bus and for the electric motor 14 through the motor control electronics unit 16.

Two more detailed descriptions are provided below, referring to FIGS. 7a and 7b.

Figure 4:
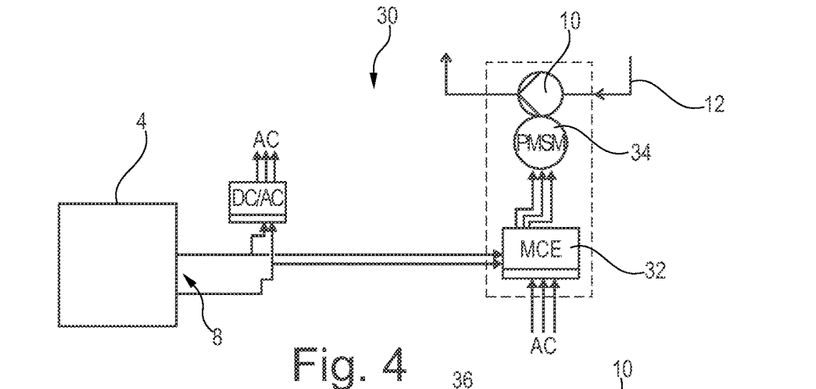
FIG. 4 shows a block-oriented, schematic illustration of a fourth exemplary embodiment of the emergency power supply system of the present invention having a permanent magnet synchronous motor.

FIG. 4 shows a still further exemplary embodiment of an emergency power supply system 30, which is comparable to the system of FIG. 1, but in a motor control electronics unit 32, a switch function is already implemented. Hence, the switch 18 shown in FIG. 1 may be eliminated, as the motor control electronics unit 32 accomplishes this function. However, it may be feasible to use a permanent magnet synchronous motor (PMSM) as an electric motor 34 mechanically coupled to the hydraulic pump 10, as the electric motor 34 comprises a lower weight in comparison to an asynchronous motor. For operating such a PMSM, a control electronics is necessary, which comprises an inverter. Besides allowing the start of the electric motor 34 from a standstill it is possible to control the rotational speed. Consequently, the hydraulic pump may be realized by means of a fixed displacement pump, which may be of a clearly lower weight in comparison to a variable displacement pump. The weight advantages of the PMSM and the fixed displacement pump potentially more than compensate the additional weight of the control electronics.

Figure 5:
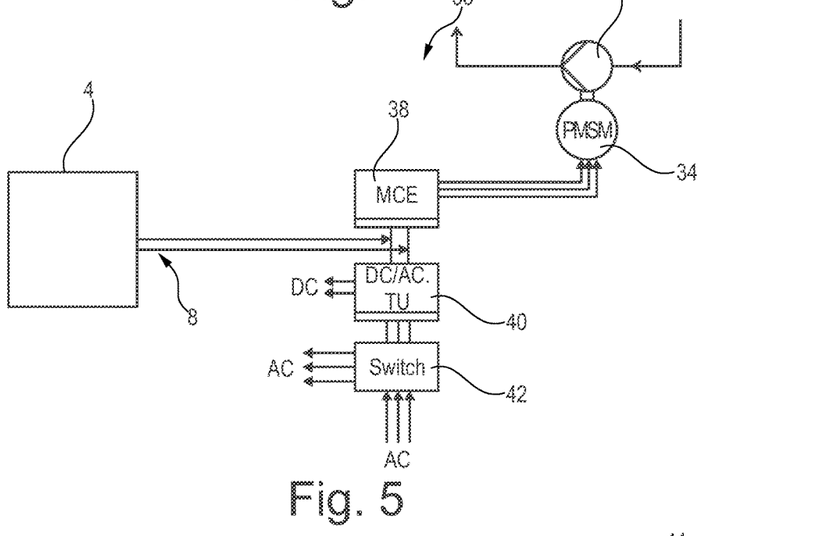
FIG. 5 shows a block-oriented, schematic illustration of a fifth exemplary embodiment of the emergency power supply system of the present invention based on the embodiment of FIG. 4, comprising a transformer and an active rectifier for generating an AC voltage.

Still further, FIG. 5 shows another exemplary embodiment of an emergency power supply system 36, in which a fuel cell stack 4 delivers a direct current to a motor control electronics unit 38 connected to the electric motor 34 driving the hydraulic pump 10. Again, the electric motor 34 is preferably realized as a permanent magnet synchronous motor.

The fuel cell stack 4 is also coupled with a conversion unit 40, which provides a power conversion of the current delivered by the fuel cell stack 4 to a DC bus, e.g. carrying a voltage of 28 V.

Still further, a switch unit 42 is coupled with the fuel cell stack 4 and delivers an AC voltage to an AC bus and is adapted for conducting the switching function for delivering electric power to the motor 34.

Figure 6:
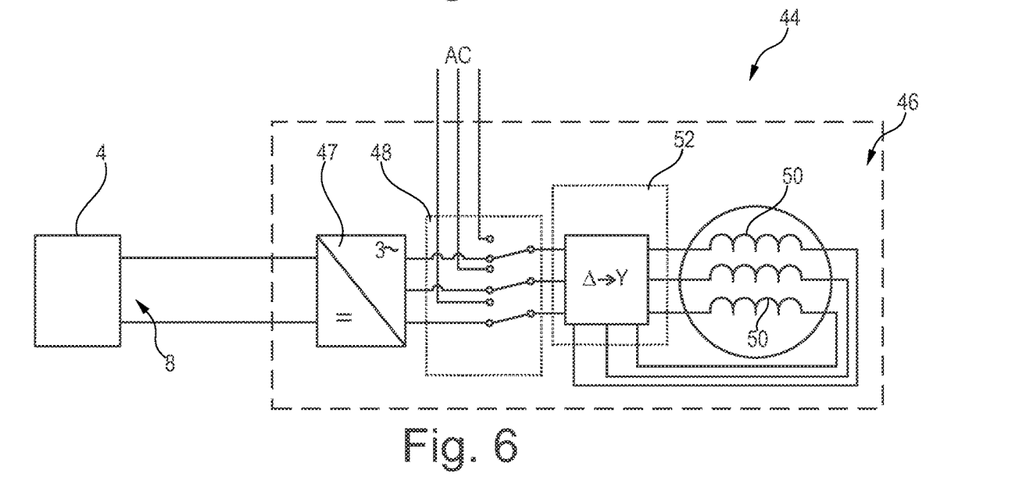
FIG. 6 shows a motor control electronics unit having a DC/AC converter, a selectable input and a reconfiguration means in a schematic, block-oriented view.

As indicated above, FIG. 6 shows a motor control electronics unit 44, which is couplable with a fuel cell stack 4, which comprises at least one fuel cell and preferably a plurality of fuel cells, and an electric motor 46. The motor control electronics unit 44 comprises a source selection switch 48, which is adapted for selectively coupling the electric motor 46 either with an outlet 8 of the fuel cell stack 4 or an AC bus. However, due to the fuel cell technology, the nominal stack voltage will be much lower, e.g. by a factor of 2, than necessary for generating the required voltage for the AC bus by an electronic inverter 47. It is therefore advantageous to use a type of electric motor 46 that comprises a certain reconfigurability. This may be achieved through an electric motor 46 with fully accessible motor phases 50, here: three, to switch them either in wye or delta mode through a mode switching unit 52. However, also another solution such as a Dahlander motor switching between delta and double wye configuration may be possible. The switches may be either mechanical contactors or solid state switches.

In this regard, it is indicated that switching from delta to wye to delta configuration in an emergency mode reduces the required DC voltage demand by a factor of the square root of 3. It may be reduced by another 15% through controlling an integrated inverter to apply third harmonic injection. Still further it may be reduced through the application of field oriented control (FOC) for controlling the electric motor 46. However, the magnitude depends on the electrical parameters of the electric motor 46. The breakdown torque of the electric motor 46 at 400 Hz does not need to be considered a sizing case for the fuel cell 4 anymore. A slight increase of the effective electrical time constant is considered to be applicable. The field-oriented control may be applied only if the electric motor 46 is operated by its dedicated power electronics in the motor control electronics unit 44.

Figure 7A:
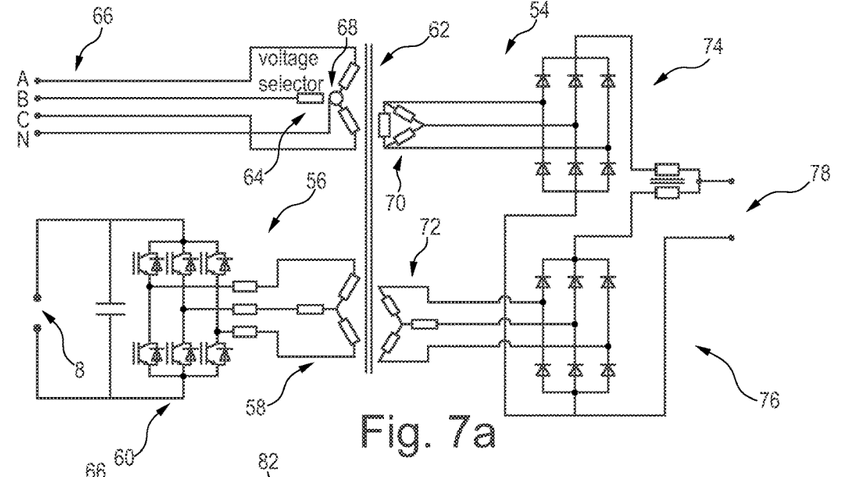
FIG. 7a shows a conversion unit for providing a DC and AC voltage from variable DC voltage or DC voltage from AC voltage, the conversion unit comprising a transformer with a fuel cell power inlet having an inverter and an AC input/output having a voltage selector.

In FIG. 7a, a possible realization of a conversion unit 54 is shown, which may be based on the conversion unit 28 shown in FIG. 3. The conversion unit 54 may be based on a transforming and rectifying unit (TRU), to which an inverter 56 is added. The inverter 56 is connected to the electric output 8 of the fuel cell stack 4. Between a set of windings 58, a filter arrangement 60 is placed. The windings 58 feed a magnetic core 62 as does a set of windings 64 coupled with a three phase AC input 66, wherein these windings 64 comprise a voltage selector 68. The windings 58 coupled with the fuel cell stack 4 are excited by an alternating current controlled by a pulse width modulation.

On the other side of the magnetic core, two sets of windings 70 and 72 are present, which each are coupled with a rectifying arrangement 74 and 76. Here, a DC port 78 is fed.

In a normal operation, i.e. in a first operation mode, electrical power is delivered from an AC bus into the three-phase AC input 66. The DC bus may be supplied with a DC voltage through the windings 64 coupled with the voltage selector 68 and the windings 70, feeding a rectifier 74, e.g. a 24 pulse rectifier, and providing a DC voltage to the DC port 78.

In a second operation mode, the fuel cell 4 delivers a DC voltage to an inverter 60, feeding the windings 58 and leading to the generation of a DC voltage to the DC bus output 78 over the windings 72 and the rectifier 76. At the same time, the windings 70 are fed, which leads to the transfer of an AC voltage to the AC bus 66.

Through the voltage selector 68, the characteristics of the power transfer from the fuel cell 4 to the AC bus 66 may be changed and voltage levels adjusted.

Figure 7B:
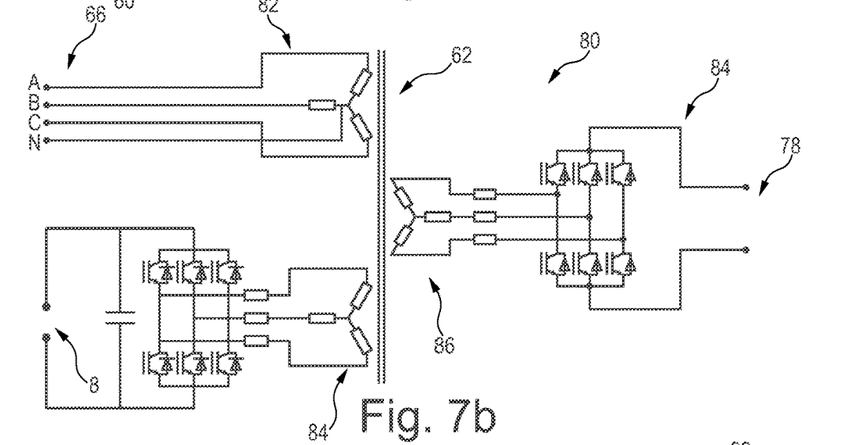
FIG. 7b shows a conversion unit for providing DC and AC voltage from variable or fixed DC voltage or DC voltage from AC voltage, the conversion unit comprising a transformer with a fuel cell power inlet having an inverter and an AC input one side of a core and an active rectifier on the other side of the core.

FIG. 7b shows a slightly modified exemplary embodiment of a motor control electronics unit 80, having a transformer with a first set of windings 82 coupled with a three phase AC input 66 as well as a second set of windings 84 couplable with a fuel cell stack 4. Regarding the arrangement of second windings 84, this may be equal to the illustration in FIG. 7a.

However, on the other side of the magnetic core 62 a third set of windings 86 is connected to an active rectifier 84 for allowing to provide continuous smooth transitions between output voltages. Furthermore, filtering weight is reduced due to a high switching frequency when active rectification is applied. Through the inverter to 8 and the active rectifier 84, the characteristics of the power transfer from the fuel cell 4 to the AC bus 66 and the DC bus 78 may be changed and voltage levels adjusted, even for each individual transformer winding, thus leading to a better compensation of asymmetric loads on the AC bus and power quality on the DC bus.

If a battery is present and permanently connected to the essential DC bus, which is connected to DC port 78, peak power demand may be reduced by variable supply of the battery buffered DC bus. Thanks to the active rectifier, bidirectional operation is possible. Therefore it is an option to additionally provide the function of a static inverter to provide 115 V AC from battery voltage in a third operation mode. In case of an emergency operation, a protection function of a circuit breaker having a predetermined maximum set current would not be required. In any case, a galvanic isolation through the transformer part shown in FIGS. 7a and 7b prevents the population of possible failure modes which may cause harmful DC currents in the AC bus.

Figure 8:
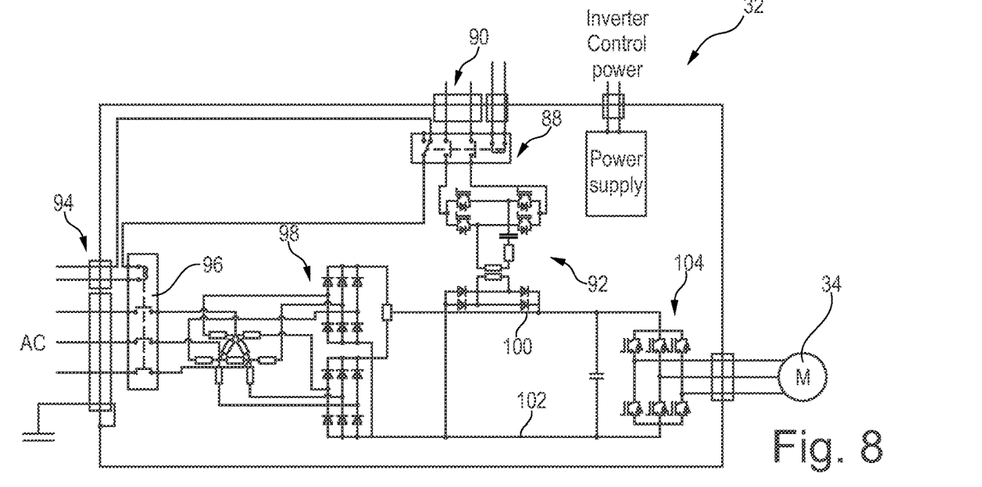
FIG. 8 shows a more detailed illustration of the system presented in FIG. 4.

FIG. 8 shows a more detailed illustration of the supply system 30 according to FIG. 4. Here, a circuit integrated into the motor control electronics unit 32 is shown. A first switch 88 is coupled with a fuel cell power inlet 90, which is adapted for providing a connection to the fuel cell power inlet 90. For being able to drive the electric motor 34, a boost converter 92, which is exemplarily realized as a resonant converter, is stepping up the voltage delivered by the fuel cell 4 to a required level.

A three phase AC input 94 is furthermore coupled with a second switch 96, which in turn is adapted for providing a connection to an AC bus of the aircraft. An auto-transformer rectifier unit 98 is present for rectifying the alternating current from the AC bus during normal operation.

Resultantly, supply lines 100 and 102 are provided with a direct current either from a fuel cell or from an AC bus of the aircraft. For providing an operation of the electric motor 34, a further inverter 104 is present, which is controllable, such that a desired frequency and voltage is applied to the electric motor 34. For example, this may be advantageous for a permanent magnet synchronous motor, which exactly follows the frequency of the current delivered by the inverter 104.

Figure 9:
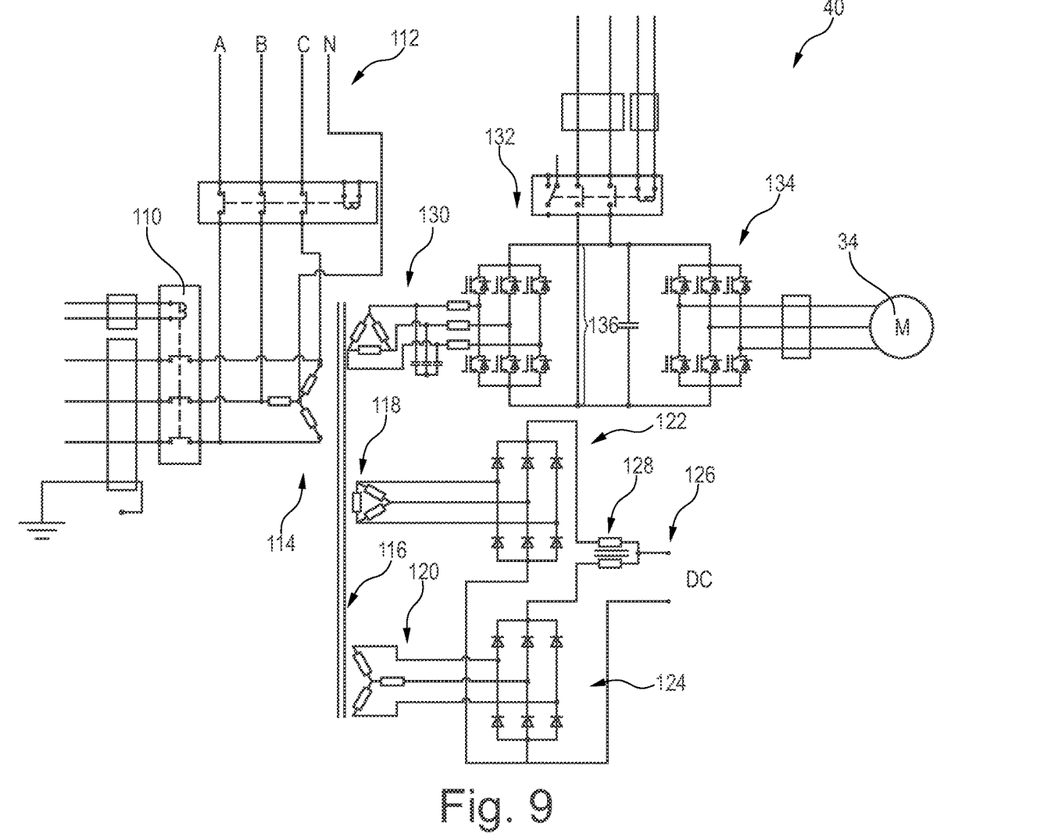
FIG. 9 shows a more detailed illustration of the system presented in FIG. 5

FIG. 9 demonstrates the system 36 shown in FIG. 5. Here, the conversion unit 40 as well as the switch 42 are combined. A three phase AC inlet 106 is coupled with a first switch 110, which allows to provide an AC voltage at an AC outlet 112, as well as to a set of windings 114 at a magnetic core 116. On the other side of the core 116, two sets of windings 118 and 120 are arranged, each coupled with a rectifier 122 and 124, which both provide a voltage to a DC outlet 126. A filter 128 is provided for especially smoothening the DC voltage at the DC outlet 126.

Still further, on the same side of the magnetic core 116, a fourth winding 130 is present, which is coupled with an inverter 132, providing power to a second inverter 134 coupled with the electric motor 34. Between the first and the second inverter 132, 134, a fuel cell power inlet 136 is arranged. Hence, power delivered from the fuel cell connected with the fuel cell inlet 136 is able to provide power to the electric motor 134. At the same time, the fuel cell is able to provide power to the other side of the magnetic core 116 to deliver an alternating current to the AC outlet 112 through the arrangement of the first inverter 132, the fourth set of windings 130, and the first set of windings 114. In terms of electrical emergency power provision, this setup comprises similar characteristics to the setup shown in FIG. 3 like a transformer providing a galvanically isolated output to an essential bus. A remarkable characteristic of this setup is, that all electrical components are always in operation and cannot suffer from sleeping failures. The conversion unit 40 is able to provide the three operation modes as explained regarding FIG. 7b, too.

Figure 10:
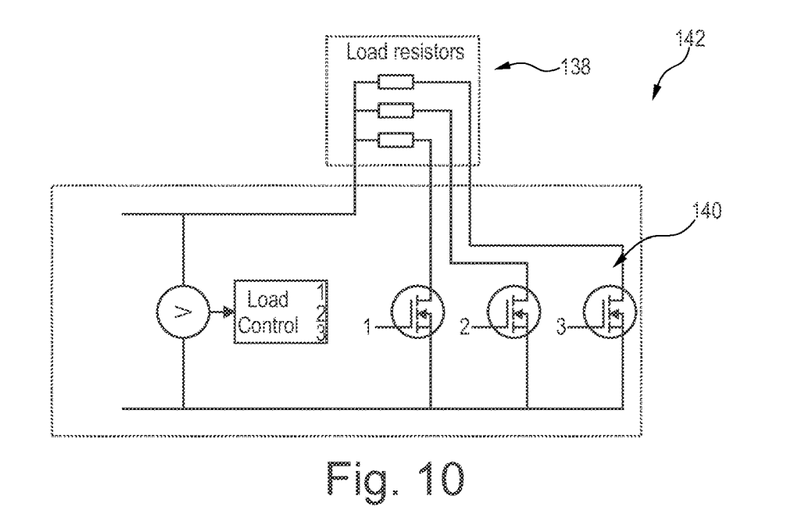
FIG. 10 shows a load control arrangement for supporting a continuous flow of oxygen depleted air.

Finally, FIG. 10 shows an additional component in form of a load control unit 142 for the emergency power supply system, which may be added to each previously described exemplary embodiment. In order to provide a required quantity of inert gas, which exits a fuel cell when the oxidant is realized by air, a certain amount of power must be drawn from the fuel cell as steady as possible, since load fluctuations would affect the inert gas quality. This may be achieved by simply connecting a load resistor 138, which are switched by appropriate solid state switches 140. For example, they are operated in a pulse width mode to control the fuel cell stack current to the required value. This arrangement of load resistors 138 and solid state switches 140 may be integrated into an existing device, such as a motor control electronics unit in order to take benefit of the existing filtering, cooling, protection and control facilities. Depending on the integration constraints of the resistors 138, it may be beneficial to split the load resistors into several smaller partitions with higher resistance. From a certain number of resistors, the pulse width modulation control may be replaced by simply switching the required number of resistors. The transistors may be even slow switching in this case. Additional filtering or shielding of the wires are not required in this case.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An emergency power supply system for providing at least hydraulic power and electric power in an aircraft, the system comprising:
    at least one fuel cell having an electric outlet for providing electric power with a DC supply voltage;
    a conversion unit for conversion of electric power, the conversion unit being couplable with the electric outlet of the at least one fuel cell and with at least one of an AC bus and a DC bus of the aircraft; and
    at least one hydraulic pump having an electric motor and a motor control electronics unit and being couplable with a hydraulic system of the aircraft for providing hydraulic power,
    wherein the conversion unit is adapted for converting the DC supply voltage of the electric outlet of the at least one fuel cell to at least one of an AC voltage matching a predetermined voltage at the AC bus and a DC voltage matching a predetermined voltage at the DC bus,
    wherein the electric motor is selectively couplable with the at least one fuel cell and the AC bus, wherein the electric motor is adapted for being selectively operated by the supply of electric power either from the at least one fuel cell or the AC bus, wherein a direct current supplied from the at least one fuel cell is converted to an alternating current, and
    wherein the electric motor comprises a stator having a set of interconnected stator windings, the electric motor being configured for changing a connection scheme of the stator windings while maintaining three phases, wherein the connection scheme of the stator windings is selectable from at least two patterns, wherein a first pattern of the at least two patterns enables the electric motor to be operated with a first voltage delivered from the AC bus and wherein a second pattern of the at least two patterns enables the electric motor to be operated with a second voltage delivered by the at least one fuel cell.

2. The emergency power supply system of claim 1, wherein the motor control electronics unit is connectable to the electric outlet of the at least one fuel cell and the electric motor,
    wherein the motor control electronics unit is adapted for converting the voltage delivered by the at least one fuel cell into a motor supply voltage applying field oriented control.

3. The emergency power supply system of claim 1,
    wherein the conversion unit is connectable to the electric outlet of the at least one fuel cell,
    wherein a transformer is connected to the conversion unit for increasing the AC voltage delivered by the conversion unit for supply into the AC bus, and
    wherein the electric motor is connectable to the conversion unit.

4. The emergency power supply system of claim 1, wherein the conversion unit is adapted for converting the DC supply voltage delivered by the electric outlet of the at least one fuel cell into the AC voltage supplyable into the AC bus and into the DC voltage supplyable to an essential DC bus.

5. The emergency power supply system of claim 1, further comprising a switching unit for selectively connecting the electric motor to either the AC bus or one of the conversion unit and the motor control electronics unit delivering a motor supply voltage.

6. The emergency power supply system of claim 5, wherein the switching unit is integrated into the motor control electronics unit and adapted for selectively connecting the electric motor to either the AC bus or an inverter arranged in the motor control electronics unit.

7. The emergency power supply system of claim 5,
wherein the electric motor is connected to the motor control electronics unit,
wherein the motor control electronics unit is connectable to the electric outlet of the at least one fuel cell,
wherein the conversion unit is connectable to the electric outlet of the at least one fuel cell and the motor control electronics unit,
wherein the switching unit is connectable to the conversion unit and the AC bus of the aircraft, and
wherein the switching unit is adapted for transferring the alternating current from the conversion unit into the AC bus of the aircraft in a galvanically separated manner.

8. The emergency power supply system of claim 1, wherein the at least one fuel cell is adapted for using air as an oxidant,
the system further comprising a load control unit adapted for selectively connecting at least one electrical load to the electric outlet of the at least one fuel cell for allowing a continuous operation of the at least one fuel cell for generating a continuous flow of oxygen depleted air.

9. The emergency power supply system of claim 1, wherein the conversion unit is adapted for being operated in at least one operation mode of a group of operation modes, the group consisting of:
1) supplying the conversion unit with an AC supply voltage from the AC bus, converting the AC supply voltage to the DC voltage matching the predetermined voltage at the DC bus,
2) supplying the conversion unit with the DC supply voltage from the at least one fuel cell, converting the DC supply voltage to the DC voltage matching the predetermined voltage at the DC bus and converting the DC supply voltage to the AC voltage matching the predetermined voltage at the AC bus, and
3) supplying the conversion unit with a DC bus supply voltage from the DC bus and converting the DC bus supply voltage to the AC voltage matching the predetermined voltage at the AC bus.

10. An aircraft comprising:
at least one AC bus;
at least one hydraulic network; and
at least one emergency power supply system comprising:
at least one fuel cell having an electric outlet for providing electric power with a DC supply voltage;
a conversion unit for conversion of electric power, the conversion unit being couplable with the electric outlet of the at least one fuel cell and with at least one of the at least one AC bus and a DC bus of the aircraft; and
at least one hydraulic pump having an electric motor and a motor control electronics unit and being couplable with the at least one hydraulic network of the aircraft for providing hydraulic power,
wherein the conversion unit is adapted for converting the DC supply voltage of the electric outlet of the at least one fuel cell to at least one of an AC voltage matching a predetermined voltage at the at least one AC bus and a DC voltage matching a predetermined voltage at the DC bus,
wherein the electric motor is selectively couplable with the at least one fuel cell and the at least one AC bus, wherein the electric motor is adapted for being selectively operated by the supply of electric power either from the at least one fuel cell or the at least one AC bus, wherein a direct current supplied from the at least one fuel cell is converted to an alternating current, and
wherein the electric motor comprises a stator having a set of interconnected stator windings, the electric motor being configured for changing a connection scheme of the stator windings while maintaining three phases, wherein the connection scheme of the stator windings is selectable from at least two patterns, wherein a first pattern of the at least two patterns enables the electric motor to be operated with a first voltage delivered from the at least one AC bus and wherein a second pattern of the at least two patterns enables the electric motor to be operated with a second voltage delivered by the at least one fuel cell.

11. The aircraft of claim 10, further comprising at least one space having an inlet for oxygen depleted air,
wherein the at least one fuel cell of the at least one emergency power supply system is adapted for using air as an oxidant, such that oxygen depleted air is generated during the operation of the at least one fuel cell, and
wherein a transport means extending from the at least one fuel cell and at least one of the at least one space delivers the oxygen depleted air into the respective space.

12. The aircraft of claim 10, wherein the at least one hydraulic pump is coupled with a hydraulic system, which does not comprise an engine driven hydraulic pump.

13. A method for providing at least hydraulic power and electric power in an aircraft, the method comprising:
providing electric power by at least one fuel cell having an electric outlet with a DC supply voltage;
converting electric power by a conversion unit provided by at least one of an AC bus and a DC bus of the aircraft and the electric outlet of the at least one fuel cell and to at least one of an AC voltage matching a predetermined voltage at the AC bus and a DC voltage matching a predetermined voltage at the DC bus;
supplying the converted electric power to at least one of the AC bus and the DC bus; and
providing hydraulic power to a hydraulic system of the aircraft by at least one hydraulic pump having an electric motor and a motor control electronics unit,
converting a direct current supplied from the at least one fuel cell to an alternating current, and
selectively changing a connection scheme of a set of interconnected stator windings of a stator of the electric motor to a first pattern that enables the electric motor to be operated with a first voltage delivered from the AC bus or to a second pattern that enables the electric motor to be operated with a second voltage delivered by the at least one fuel cell while maintaining three phases.

14. The method of claim 13, wherein the conversion unit is operated in at least one operation mode of a group of operation modes, the group consisting of:
1) supplying the conversion unit with an AC supply voltage from the AC bus, converting the AC supply voltage to the DC voltage matching the predetermined voltage at the DC bus,
2) supplying the conversion unit with the DC supply voltage from the at least one fuel cell, converting the DC supply voltage to the DC voltage matching the predetermined voltage at the DC bus and converting the DC supply voltage to the AC voltage matching the predetermined voltage at the AC bus, and
3) supplying the conversion unit with a DC bus supply voltage from the DC bus and converting the DC bus supply voltage to the AC voltage matching the predetermined voltage at the AC bus.

* * * * *